United States Patent
Clausen et al.

(10) Patent No.: US 7,656,900 B2
(45) Date of Patent: Feb. 2, 2010

(54) METHODS AND SYSTEMS FOR ADAPTIVE COMMUNICATION

(75) Inventors: Axel Clausen, München (DE); Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 490 days.

(21) Appl. No.: 11/523,145

(22) Filed: Sep. 19, 2006

(65) Prior Publication Data

US 2008/0069017 A1  Mar. 20, 2008

(51) Int. Cl.
*H04J 3/16* (2006.01)

(52) U.S. Cl. ........................ 370/468; 370/390
(58) Field of Classification Search ........................ None
See application file for complete search history.

(56) References Cited

U.S. PATENT DOCUMENTS

| | | | |
|---|---|---|---|
| 7,274,679 B2 * | 9/2007 | Amit et al. | 370/343 |
| 2005/0286535 A1 * | 12/2005 | Shrum et al. | 370/395.21 |
| 2006/0002370 A1 * | 1/2006 | Rabie et al. | 370/351 |
| 2007/0064726 A1 * | 3/2007 | Rostron | 370/464 |
| 2007/0127489 A1 * | 6/2007 | Amaya et al. | 370/395.2 |

OTHER PUBLICATIONS

"xDSL Modulation Techniques—Methods of achieving spectrum-efficient modulation for high quality transmissions", A Nextep Broadband White Paper, May 2001,9 pgs.

* cited by examiner

*Primary Examiner*—Phirin Sam
(74) *Attorney, Agent, or Firm*—Eschweiler & Associates, LLC (57) ABSTRACT

One embodiment of the present invention relates to a method of limiting data loss in a point-to-multipoint communication system. Data is transferred on a communication channel among network nodes of the point-to-multipoint communication system according to an initial frequency band plan. If a characteristic of the communication channel changes, then data is transferred among the network nodes according to a modified frequency band plan that differs from the initial frequency band plan.

23 Claims, 5 Drawing Sheets

METHODS AND SYSTEMS FOR ADAPTIVE COMMUNICATION

FIELD OF THE INVENTION

The present invention relates generally to communication methods and systems, and more specifically to adaptive communication service in a communication system.

BACKGROUND OF THE INVENTION

In today's business climate, industry fortunes rise and fall on whether information is exchanged in an efficient manner. For example, cell phones, pagers, and the Internet have thrived because each technology allows businesses to exchange critical market information at a moment's notice. In addition, such technologies allow individuals to keep abreast of recent developments with family and friends. In short, many segments of our modern society require instant access to accurate, up-to-the-minute information.

Companies spend significant resources to develop modern communication systems that provide people with such information. As networked communication systems have matured, data rates have increased from 20 kilobits per second (kb/s) in 1975, to 100 Mb/s with modern VDSL. In other words, customers in today's "information age" can receive data approximately 5,000 times as fast as network customers of thirty years ago. To bring customers into this modern "information age", developers have spent billions of dollars to develop network technology as we now know it. To continue to increase data rates at such a remarkable pace, communication systems developers will likely be required to spend significant capital resources for many years to come.

When such high speed data arrives at a customer premises (e.g., a individual's home or office), a point-to-multipoint network can distribute that high-speed data to various user devices (e.g., TV sets, computers, video conferencing devices, etc.) Thus, a point-to-multipoint communication system can distribute high-speed or broadband data to multiple network nodes.

In existing point-to-multipoint communication systems (e.g., home networks), multiple network nodes cause signal reflections that can significantly increase signal attenuation. Reflections in these communication systems result in the additions of data signals (e.g., data symbols), and can ultimately cause the signals to spread over time. Due to reflections, signal attenuation might be very different from one network node to another. Further, any change in network configuration (e.g., addition or removal of a network node), may change the attenuation between all other nodes because it changes the signal reflected from this node. Thus, point-to-multipoint communication systems are very dynamic, and the transmission technology used to transmit high-speed data should be capable of adjusting its parameters quickly to adapt to changes in the system.

Existing communication systems that use continuous transmission mode (e.g., DSL, ADSL, VDSL) are advantageous because they have relatively high data rates due to extensive training prior to the data transmission. However, these existing systems suffer from a major drawback in point-to-multipoint communication systems because they must undergo extensive re-training to adapt to considerable changes in channel characteristics. This re-training takes a rather long time (e.g., approximately 30 seconds), and as such makes continuous transmission mode data transfer impractical in existing point-to-multipoint communication systems.

While the existing methods and systems for point-to-multipoint communication systems are sufficient for their stated purpose, they are not sufficient to accurately account for changes in a characteristic of the communication channel during communication service. Thus, improved methods and systems are needed.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment of the present invention relates to a method of limiting data loss in a point-to-multipoint communication system. Data is transferred on a communication channel among network nodes of the point-to-multipoint communication system according to an initial frequency band plan. If a characteristic of the communication channel changes, then data is transferred among the network nodes according to a modified frequency band plan that differs from the initial frequency band plan.

The following description and annexed drawings set forth in detail certain illustrative aspects and implementations of the invention. These are indicative of but a few of the various ways in which the principles of the invention may be employed.

DETAILED DESCRIPTION OF THE INVENTION

The present invention will now be described with reference to the drawings wherein like reference numerals are used to refer to like elements throughout, and wherein the illustrated structures are not necessarily drawn to scale. In various embodiments, the invention finds utility in point-to-multipoint communication systems, although the invention also finds utility in other communication systems.

Figure 1:
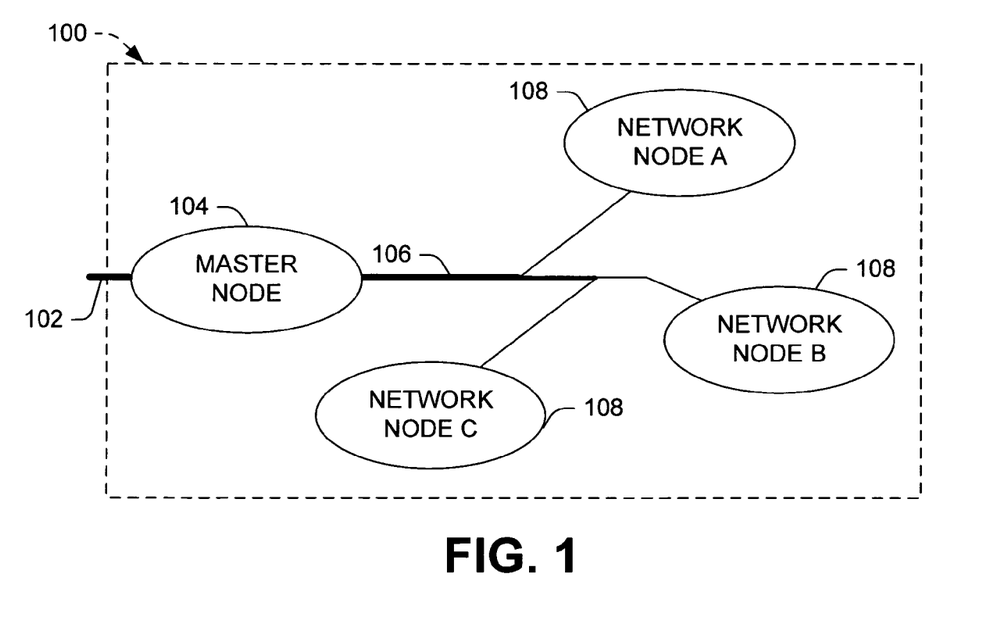
FIG. 1 illustrates one embodiment of a point-to-multipoint communication system.

FIG. 1 shows one embodiment of a point-to-multipoint communication system 100. In one embodiment, the point-to-multipoint communication system relates to a local area network, such as a home network. In one embodiment the point-to-multipoint communication system transfers data via a continuous transmission mode. Although described and illustrated as a hardware structure, the functionality and corresponding features of the system can also be performed by appropriate software routines or a combination of hardware and software. Thus, the present invention should not be limited to any particular implementation and shall be construed to cover any implementation that falls within the spirit and scope of the claims.

In one embodiment, the point-to-multipoint communication system 100 is configured to be coupled to a transmission line 102 to facilitate the transfer of high-speed data between the point-to-multipoint communication system 100 and an external device or system (not shown). For example, the point-to-multipoint communication system 100 could transfer high speed data with an external device, wherein the high-speed data could relate to, but is not limited to, one or more of: INTERNET data, telephony data, video data, video teleconferencing data, and the like. Illustrative transmission lines 102 could include, but are not limited to: wire transmission lines (e.g., twisted pair of copper wires), cable transmission lines (e.g., coax cable), optical transmission lines, and wireless transmission lines, any of which could support single or multi-carrier communication.

The illustrated point-to-multipoint communication system 100 includes a master node 104 that is configured to be coupled between the transmission line 102 and a communication channel 106, which is coupled to multiple network nodes 108 (e.g., network node A, network node B, and network node C). As with the transmission line 102, the communication channel 106 can be a wire connection, a cable connection, an optical fiber connection, a wireless connection, or some other type of connection. In one embodiment, the communication channel 106 is a twisted pair of copper wires in a residential phone system. Thus, one communication channel could be, for example, the wiring associated with an existing phone network in a residential home or an office.

In various embodiments, the master node 104 facilitates the distribution of high-speed data to the network nodes 108. The master node 104 could, for example, be located at a customer's residence in the form of a residential gateway (RG) or a DSL modem (CPE). In one embodiment, the network nodes 108 could include various home appliances (e.g., computer, television or another video system, videoconferencing device, refrigerator, etc.), which are coupled to one another via an existing phone network in a residential home or office and which communicate over the communication channel via DSL technology.

The network nodes may have different bandwidth requirements or different priorities associated therewith. For example, one network node may relate to video, which could be a high-priority service that requires a relatively high-bandwidth, interruption-free data stream for acceptable service. By contrast, a refrigerator could be a low-priority service that requires relatively low bandwidth or even zero bandwidth at various times.

In one embodiment discussed with reference to FIGS. 2A-2C, the network nodes may communicate using discrete multi-tone (DMT) technology or any other technology that utilizes multiple frequency bands to transfer data. One could think of one type of DMT technology as dividing the frequency spectrum available on a communication channel 106 into numerous individual frequency bands (or sub-carriers 202), and then transmitting data over each sub-carrier 202. For example, in one DMT implementation, 247 separate sub-carriers, each 4 KHz wide will span the frequency range on which the nodes communicate. Thus, by using DMT, the network nodes could transfer data over 247 sub-carriers of one communication channel, and thereby receive high-speed data, although different numbers of sub-carriers could be utilized in other embodiments. In various implementations, sub-carriers 202 may also be referred to as sub-channels, frequency bands, tones, and the like.

In one embodiment, different frequency bands (several subcarriers) are assigned as up- and downstream bands for each node. The nodes will receive and transmit data simultaneously separated by frequency division multiple access (FDMA).

In one embodiment, the master node 104 assigns each network node 108 to two frequency band plans based on the individual node's relative priority, wherein the two frequency band plans may be referred to as an initial frequency plan band and a modified frequency band plan. While the initial frequency band plan is employed, the nodes may transfer data and can simultaneously monitor the communication channel 106. If a characteristic of the communication channel changes, the node that detects the change can notify the system and thereafter switch from the initial frequency band plan to the modified frequency band plan.

Figure 2A:
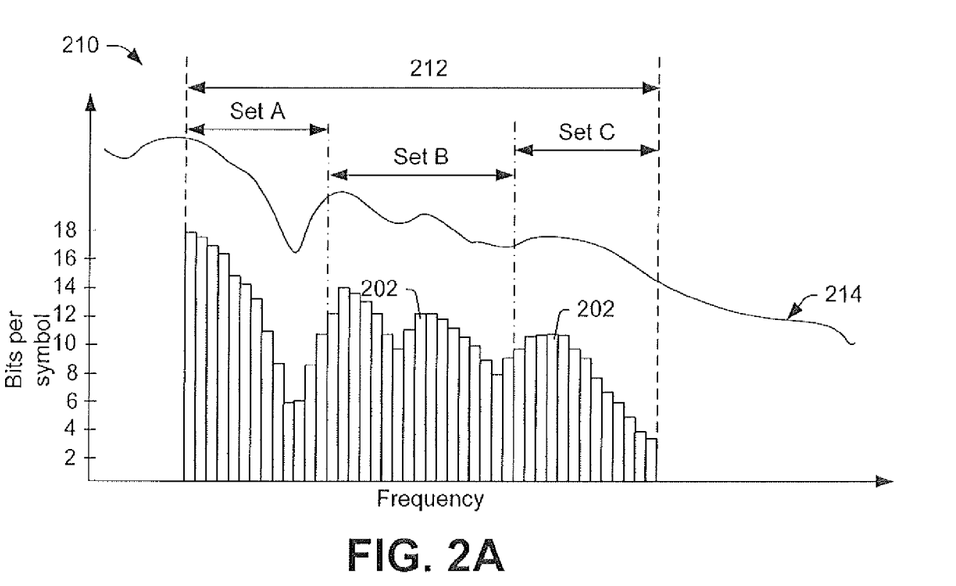
FIGS. 2A-2C relate to one embodiment of a point-to-multipoint communication system.
Figure 2B:
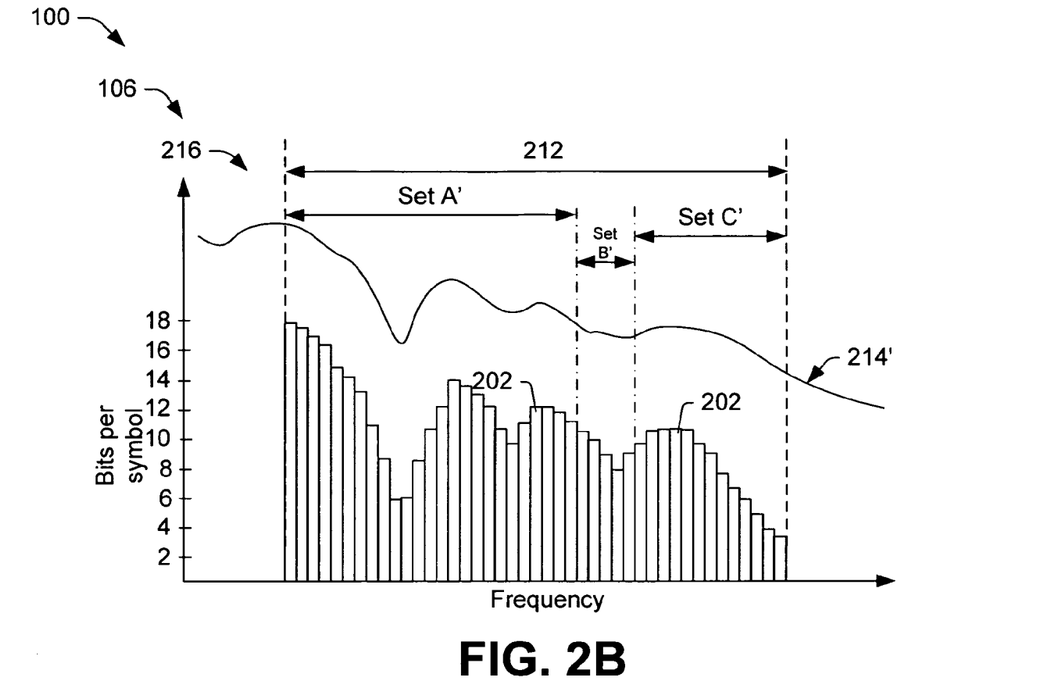

As shown in FIG. 2A, one illustrative initial frequency band plan 210 can span the frequency range 212 that the nodes utilize in communication. In the illustrated initial frequency band plan 210, initial sets of frequencies (e.g., Set A, Set B, and Set C) are associated with individual network nodes (e.g., FIG. 1 network node A, network node B, network node C, respectively). As shown, each initial set of frequencies can comprise a pre-determined number of sub-carriers 202, on which symbols or other data elements can be transferred.

Although FIG. 2A shows the individual initial sets of frequencies Set A, Set B, Set C as continuous frequency ranges (e.g., adjacent sub-carriers); in other embodiments the sub-carriers could be associated with the network nodes in other ways. For example, other embodiments could use TDMA, CDMA, or other methods to assign the sub-carriers to the various individual network nodes. Thus, in these embodiments, the individual initial sets of frequencies could include sub-carriers that are non-adjacent (i.e., not in a continuous frequency range). In addition, each initial set of frequencies can be subdivided into one frequency band for transmitting data (e.g., an upstream band) and another frequency band for receiving data (e.g., a downstream band).

During the initial frequency band plan, the number of bits transmitted per symbol on each sub-carrier 202 may be based on the measured SNR 214 (e.g., the SNR 208 associated with each sub-carrier 202). Typically, more bits are transmitted on sub-carriers that have a relatively high SNR, while fewer bits are transmitted on sub-carriers that have a relatively low SNR. If the noise on one sub-carrier becomes too high, then the communicating nodes can switch one or more bits carried by this sub-carrier to another sub-carrier. Thus, the nodes can continually switch data from one sub-carrier to another to provide users a high initial data rate that has relatively few data errors. Although monitoring the sub-carriers and encoding and decoding messages on each sub-carrier makes this multi-carrier communication computationally complex, it gives the nodes the ability to provide users with high speed data connections with relatively few errors even for unstable noise environment.

If a significant change in a characteristic of the communication channel is detected (e.g., a device is connected to or disconnected from the point-to-multipoint communication system), the system can switch from the initial frequency band plan to a modified frequency band plan. In such a modified frequency band plan, the master node 104 can assign bandwidth (e.g., number of sub-carriers) based on the relative priority of the various network nodes. As shown in FIG. 2B, one illustrative modified frequency band plan 216 can provide modified sets of frequencies (e.g., Set A', Set B', and Set C') that are associated with each network node (e.g., network node A, network node B, and network node C, respectively). In one embodiment, the modified sets of frequencies differ from the initial sets of frequencies in the number of sub-carriers 202 associated with each network node 108. For example, one node (e.g., network node A) could transfer data with a first modified frequency set (e.g., Set A') that provides an increased bandwidth, while another node (e.g., network node B) could transfer data with a second modified frequency set (e.g., Set B') that provides a decreased bandwidth. It will be appreciated that although FIG. 2B shows the modified sets of frequencies (Set A', Set B', Set C') as continuous frequency ranges (e.g., adjacent sub-carriers); in other embodiments the sub-carriers could be associated with the network nodes in other ways.

Figure 2C:
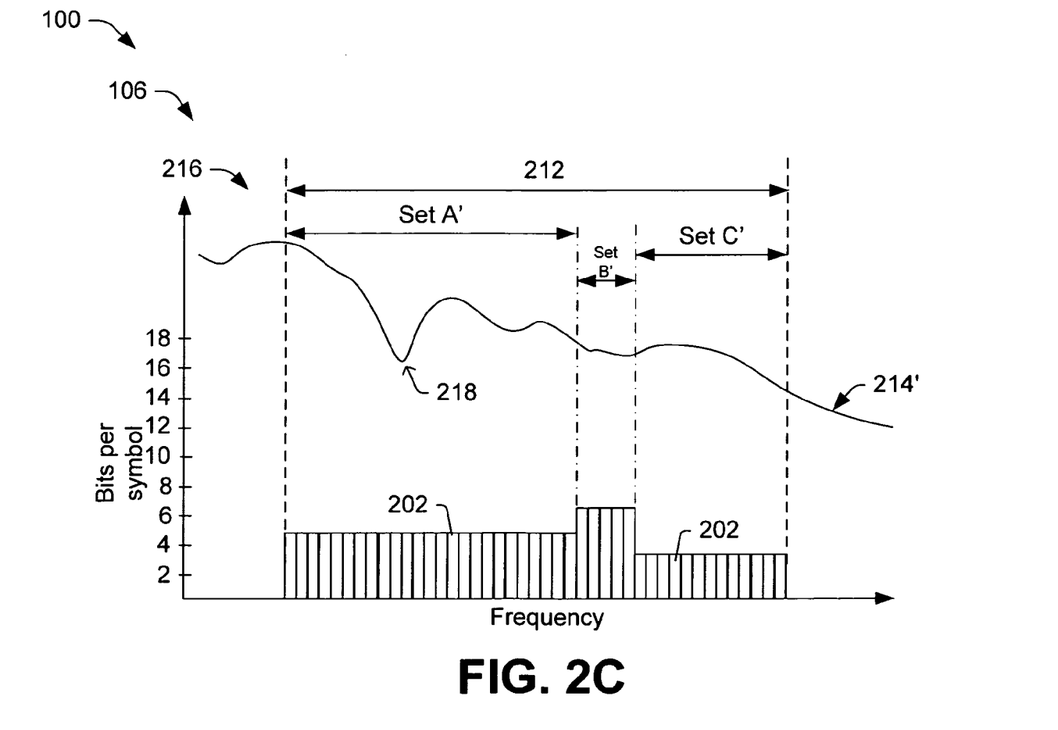

As shown in one embodiment in FIG. 2C, at various times while the modified frequency plan is in use, a common constellation size may be used for all the sub-carriers 202 associated with an individual network node, wherein the common constellation size relates to the number of bits transferred on each sub-carrier. The constellation size could be related to, for example, the minimum SNR associated with each network node (e.g., SNR relative minimum 218 associated with node A). In other embodiments, a common constellation size may be used for all sub-carriers that span the frequency range 212 (e.g., all network nodes can share one common constellation size).

In addition to or in substitution of one or more of the illustrated components, the illustrated communication system and other systems of the invention include suitable circuitry, state machines, firmware, software, logic, etc. to perform the various methods and functions illustrated and described herein, including but not limited to the methods described below. While the methods illustrated below are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of communication systems which are illustrated and described herein (e.g., point-to-multipoint communication system 100 in FIG. 1) as well as in association with other systems not illustrated, wherein all such implementations are contemplated as falling within the scope of the present invention and the appended claims.

Figure 3:
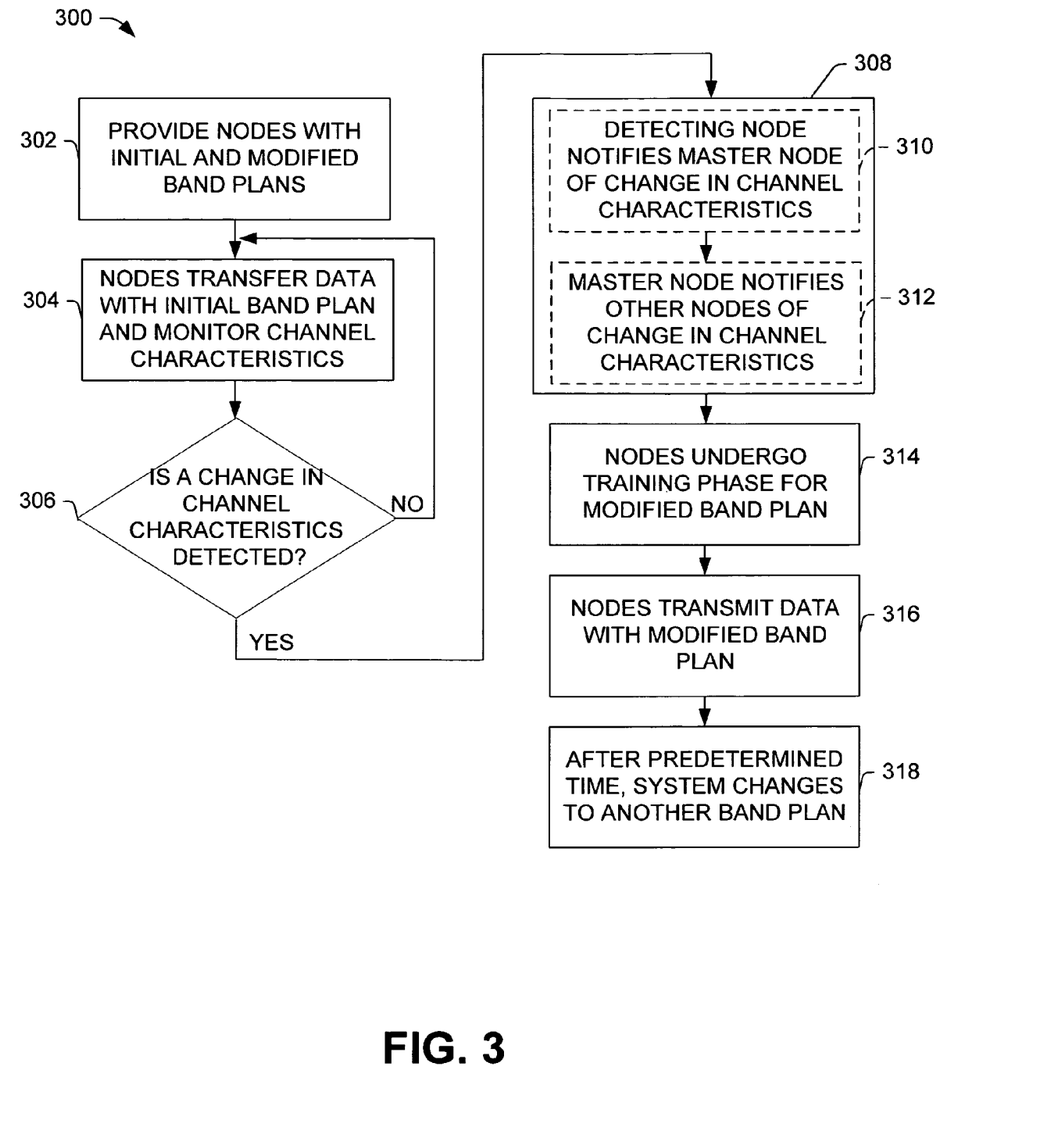
FIG. 3 is a flow chart relating to one embodiment of a communication protocol for a point-to-multipoint communication system.

FIG. 3 illustrates one embodiment in which a method 300 is used to limit data loss in a point-to-multipoint communication system (e.g, point-to multipoint communication system 100 in FIG. 1). In the method, network nodes are configured to dynamically alter the bandwidth at which data is transferred between nodes to account for changes in a communication channel characteristic as a function of an initial frequency band plan and a modified frequency band plan. If an event changes the channel characteristics, the system limits the data loss of a high-priority network node according to the corresponding quality-of-service (QoS) requirements. In the case of an emergency, this modified frequency band plan can distribute available bandwidth between the nodes so that higher priority services (e.g., with more strict QoS requirements) will get more bandwidth, enabling them to recover quickly. After recovery, the system can transfer data according to another frequency band plan, which transfers the excess bandwidth from high-priority services back to the low-priority services.

As shown, in step 302, the master node 104 provides the network nodes 108 with an initial frequency band plan and a modified frequency band plan. In one embodiment, the bandwidth associated with the initial and modified frequency band plans can be prioritized as a function of the QoS requirements associated with the network nodes.

In step 304, as data is transferred between the network nodes and the master node, the network nodes monitor the characteristics of the communication channel. If a network node detects a change in a channel characteristic ("YES" at 306), then that node notifies the other nodes of the change in step 308. If no change is detected ("NO" at 306), then the nodes continue to transfer data with the initial frequency band plan while monitoring the channel characteristics.

In step 308, the network nodes and the master node receive notification of the change in channel characteristics. In one embodiment, the network node that detects the change in the channel characteristics notifies the master node in step 310. Then the master node notifies the other non-detecting network nodes of the change in the channel characteristic in step 312.

In step 314, the network nodes perform an initialization to enable adaptive communication with the master node via the modified frequency band plan. In one embodiment, this initialization could include each network node training its equalizer and determining one common constellation size to be used for all subcarriers on which data symbols will be communicated between that network node and the master node during the modified frequency band plan. This constellation size could be exchanged between the master node and the network node during initialization.

In step 316, the network nodes communicate with the master node via the modified frequency band plan. In one embodiment, the network nodes will transfer data with the master node according to the common constellation size for all sub-carriers associated with a particular network node.

In step 318, the system changes to another frequency band plan. For example, the system could return to the initial frequency band plan after a pre-determined time. In other embodiments, the system could return to the initial frequency band plan after the occurrence of some event. In still other embodiments, the system could implement a frequency band plan other than the initial frequency band plan.

Figure 4:
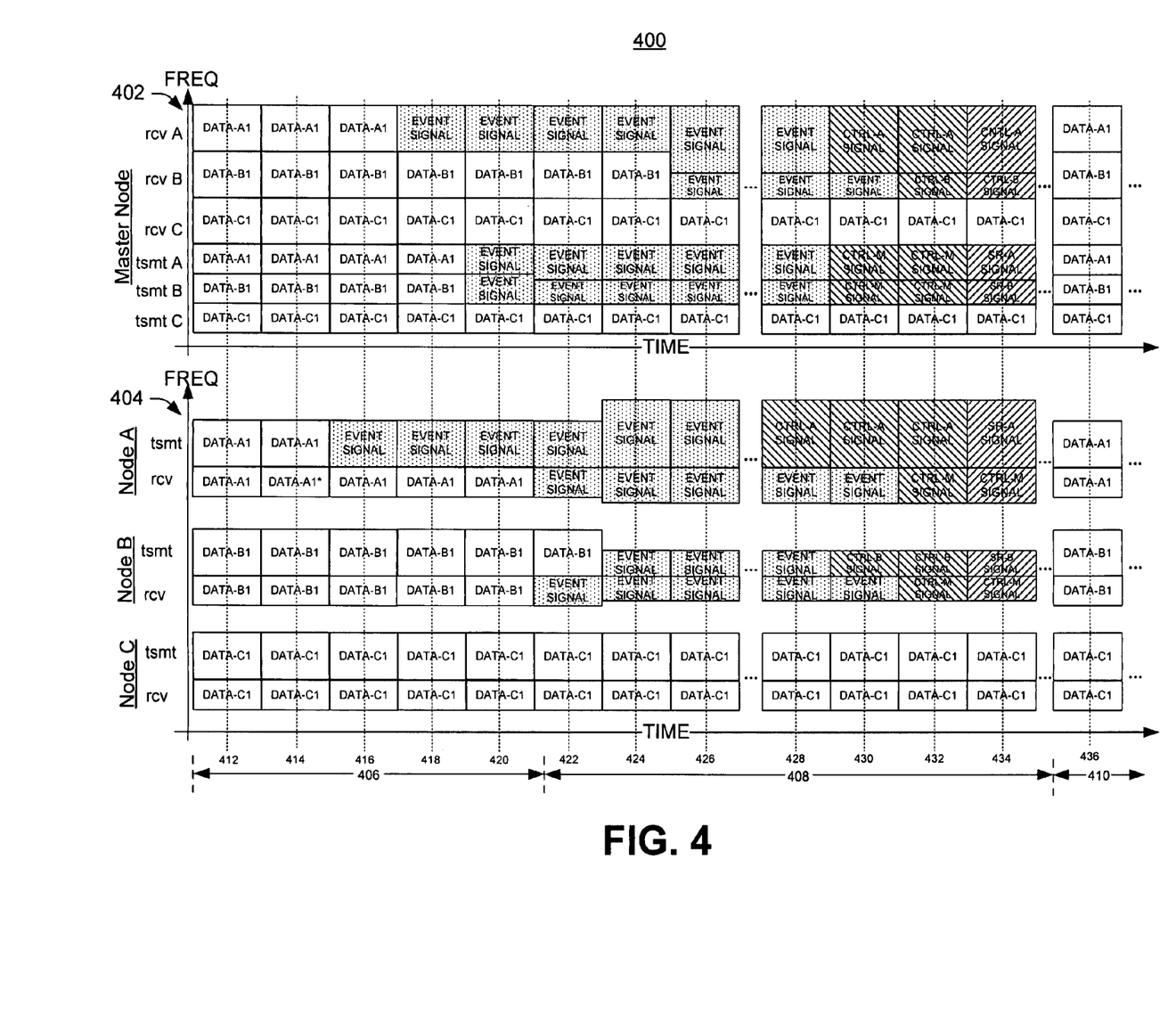
FIG. 4 is a chart relating to one embodiment of a communication protocol for a point-to-multipoint communication system.

FIG. 4 illustrates another embodiment in which a communication protocol 400 is used to limit data loss in a point-to-multipoint communication system. Although the invention extends to any number of channels, FIG. 4 shows six channels associated with the master node 402 and six channels associated with the network nodes 404. With regard to the six channels of the master node 402, three of the channels are used to transmit data to the network nodes (tsmt A, tsmt B, and tsmt C), while the other three channels are used to receive data from the network nodes (rcv A, rcv B, and rcv C). Each of the channels may comprise a number of sub-carriers on which data (e.g., a DSL symbol) is transferred. Similarly, with regard to the six channels associated with the network nodes 404, each network node has one channel for transmitting data (e.g., Node A tsmt) and another channel for receiving data (e.g., Node A rcv). In the top and bottom portions of the figure, the x-axes correspond to time and the y-axes correspond to the frequencies utilizes for communication between the various nodes. The height of the data elements or signals (e.g., DSL symbols) in the y-direction corresponds to the amount of bandwidth associated therewith.

In one embodiment of the communication protocol, data is initially transferred between the nodes according to an initial frequency band plan (time span 406), then changes to a modified frequency band plan (time span 408), and then changes back to initial frequency band plan or another frequency band plan (time span 410). Further, in the illustrated embodiment, Node A has high priority, Node B has low priority, and node C is unaffected by the disturbance and its bandwidth is not needed for any nodes with high priority. As such, it continues to transfer data at a constant bandwidth and/or data rate during the initial frequency band plan and the modified frequency band plan.

As shown at time 412, the master node communicates with the network nodes according to the initial frequency band plan. Thus, during this time, there can be a unique initial bandwidth and a unique initial data rate associated with the master node and each network node. In addition the network nodes are monitoring the characteristics of the channel at this time.

At time 414, network node A detects a severe disturbance in its receive channel (denoted by "Data-A1*"). For example, network node A could detect a dropped packet or another change in the characteristic of the communication channel.

At time 416, network node A transmits an event signal to the master node to indicate that it detected a characteristic of the communication channel. This event signal could be, for example, a DSL symbol that includes information that indicates that network node A has detected a severe disturbance in its received channel.

At time 418, network node A continues to transmit the event signal, and the master node receives the event signal on its receive channel that is associated with network node A.

At time 420, the master node transmits an event signal to network nodes A and B via their associated transmit channels.

At time 422, the master node implements the modified frequency band plan with respect to the transmitted signals. Thus, because network node A has a higher priority in the illustrated embodiment, the master node transmits the event signal to network node A over a greater bandwidth (e.g., a greater number of sub-carriers). Conversely, because network node B has a lower priority, the master node transmits the event signal to network node B over a lesser bandwidth (e.g., a fewer number of sub-carriers). In addition at time 422, network nodes A and B each receive an event signal from the master node and begin a training phase.

At time 424, the network nodes A and B begin to transmit and receive data to and from the master node by using the modified frequency band plan. The network nodes can also continue their training phase at this time. In one embodiment as part of the training phase, the network nodes A and B can begin to reconfigure their equalizers at this time.

At time 426, the master node starts to receive data according to the modified frequency band plan from the network nodes. Thus, in one embodiment, the master node can begin reconfiguring its equalizer at this time. The network nodes can continue their training phase at this time.

At time 428, network node A has finished its training phase and sends a control signal CTRL-A to the master node to so indicate. In one embodiment, this control signal CTRL-A can include a desired constellation size to be used in transferring subsequent user data. Network node B and the master node continue in their training phase.

At time 430, network node B has finished the training phase and sends a control signal CTRL-B to the master node to so indicate. Master node has also finished its training phase at this time, and sends a control signal CTRL-M to the network nodes to so indicate. These control signals can also include a desired constellation size to be used in transferring subsequent user data. Network node A continues to send a control signal CTRL-A to the master node, and the master node receives such control signal.

At time 432, the network nodes receive the control symbol CTRL-M from the master node, and the master node has received the control signals CTRL-A and CTRL-B from the network nodes. Thus, at this time, each node has information that the various nodes are all prepared to transmit user data with the modified frequency band plan and with, for example, agreed upon constellation sizes.

At time 434, the nodes can transfer system recovery signals (e.g., SR-A signal) using the communicated constellation sizes. The system recovery signals can include user data and, if the number of sub-carriers in the modified frequency band is properly chosen, then node A can transmit and receive data with the same bit rate that was used before the channel characteristic changed. The system recovery signals can be used to re-estimate the SNR on all sub-carriers and to exchange new bit loading for all sub-carriers.

At time 436, the nodes will be provided with a new frequency band plan (e.g., for a new network topology with an added device), and the system can return network node B to its original bandwidth.

Therefore, in one embodiment of the communication protocol, it is possible to limit the interruption of high-priority services to a few multi-carrier symbols. In this embodiment, depending on the length of the symbols, the outage time will be relatively short, for example, much smaller than one second.

In other embodiments, the system recovery signals could always be transmitted with a fixed constellation. Then the control signal would not have a constellation size encoded, but would only signal to the other side that the system will switch from event signals to system recovery symbols.

In still other embodiments, it is possible to fix the number of transmitted event signals and/or the number of transmitted control signals.

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A point-to-multipoint communication system, comprising:
   a first network node configured to be coupled to a multi-carrier communication channel including a plurality of subcarriers; wherein the first network node is configured to dynamically alter bandwidth at which data is transferred to account for a change in a characteristic of the communication channel;

wherein the first network node is further configured to transfer data during a first time interval over a first set of initial frequencies that are selected from the plurality of subcarriers to provide a first bandwidth, and to transfer data during a second time interval over a first set of modified frequencies that are selected from the plurality of subcarriers to provide a second bandwidth; the first set of initial frequencies differing from the first set of modified frequencies such that the first and second bandwidths account for the change in the characteristic of the communication channel.

2. The communication system of claim 1, further comprising:

a second network node configured to be coupled to the multi-carrier communication channel and configured to dynamically alter bandwidth at which data is transferred;

wherein the second network node is configured to transfer data during the first time interval by using a second set of initial frequencies that differs from the first set of initial frequencies, and is further configured to transfer data during the second time interval according to a second set of modified frequencies that differs from the first set of modified frequencies.

3. The communication system of claim 1, wherein the first set of initial frequencies comprises one number of frequencies on which data is transferred, and wherein the first set of modified frequencies comprises an other number of frequencies.

4. The communication system of claim 3, wherein the one number of frequencies is less than the other number of frequencies.

5. The communication system of claim 4, wherein the first network node uses a common data size to transfer data on the other number of frequencies of the first modified set of frequencies, such that the data rate associated with the first network node is approximately constant during at least portions of the first and second time intervals.

6. A method of limiting data loss in a point-to-multipoint communication system, comprising:

transferring data on a communication channel among network nodes of the point-to-multipoint communication system according to an initial frequency band plan, wherein the initial frequency band plan comprises:

an initial first set of frequencies associated with a first network node coupled to the communication channel; and an initial second set of frequencies associated with a second network node coupled to the communication channel;

if a characteristic of the communication channel changes, then transferring data among the network nodes of the communication system according to a modified frequency band plan that differs from the initial frequency band plan.

7. The method of claim 6, wherein the initial and modified frequency band plans comprise a number of frequencies associated with each node, and wherein the number of frequencies associated with at least two nodes differs between the initial frequency band plan and the modified frequency band plan.

8. The method of claim 7, further comprising:
transferring data according to another frequency band plan at a predetermined time after data is transferred with the modified frequency band plan.

9. The method of claim 6, wherein the modified frequency band plan comprises:

a modified first set of frequencies that is associated with the first network node, wherein the modified first set of frequencies provides a bandwidth that is less than the bandwidth associated with the initial first set of frequencies; and a modified second set of frequencies that is associated with the second network node, wherein the modified second set of frequencies provides a bandwidth that is greater than the bandwidth associated with the initial second set of frequencies.

10. The method of claim 9, wherein the change in the characteristic of the communication channel relates to a change in a number of network nodes connected to the communication system.

11. A method of limiting loss in a point-to-multipoint communication system, comprising:

transferring data over a communication channel among a set of network nodes of a point-to-multipoint communication system at a set of initial data rates during an initial frequency band plan, wherein individual initial data rates of the set of initial data rates are associated with individual network nodes of the communication system; and if a characteristic of the communication channel changes, then transferring data at a set of modified data rates during a modified frequency band plan, wherein individual modified data rates of the set of modified data rates are associated with individual network nodes of the communication system.

12. The method of claim 11, further comprising:
transferring data at the initial data rate at a predetermined time after data is transferred at the modified data rate.

13. The method of claim 12, wherein the initial frequency band plan comprises:

an initial set of frequency bands, wherein individual frequency bands of the initial set of frequency bands are associated with the individual network nodes.

14. The method of claim 13, wherein the modified frequency band plan comprises:

a modified set of frequency bands that differs from the initial set of frequency bands, wherein the individual modified frequency bands are associated with the individual network nodes.

15. The method of claim 14, wherein a master node assigns the initial and modified frequency band plans to the network nodes.

16. The communication system of claim 15, wherein the initial frequency set of the first network node and the modified frequency set of the first network node are assigned before a change of the characteristic of the channel has been detected.

17. A method for limiting data loss in a continuous transmission mode point-to-multipoint communication system, comprising:

transferring data on a communication channel between a master node and network nodes of the point-to-multipoint communication system according to an initial frequency band plan comprising an initial number of subcarriers associated with the individual network nodes;

if a characteristic of the communication channel changes, then notifying the network nodes of the change; and transferring data between the master node and the network nodes according to a modified frequency band plan comprising a modified number of sub-carriers associated with the individual network nodes.

18. The method of claim 17, wherein one network node detects the change in the characteristic of the communication channel and notifies the master node of the change, and wherein the master node notifies another network node of the change.

19. The method of claim 17, further comprising:
undergoing a training phase after notifying the network nodes of the change, wherein the training phase prepares the network nodes to transfer a system recovery signal.

20. The method of claim 19, wherein at a time related to the completion of the training phase, a network node sends a control signal to the master node.

21. The method of claim 20, wherein the control signal comprises one constellation size to be used over all subcarriers associated with the network node during the transfer of the system recovery signal.

22. The method of claim 19, further comprising:
transferring the system recovery signal; and
transferring user data between the master node and the network nodes according to another frequency band plan after the system recovery signal is transferred.

23. A point-to-multipoint communication system, comprising:
network nodes configured to be coupled to a master node via a communication channel and configured to communicate over a plurality of frequencies;
means to assign the network nodes to an initial frequency band plan having a plurality of subcarriers, wherein the network nodes are associated with respective initial bandwidths in the initial frequency band plan; and
means to assign the network nodes to a modified frequency band plan having the plurality of subcarriers, where in the modified frequency band plan at least one of the network nodes is assigned to at least one different subcarrier than in the initial frequency band plan so the initial bandwidth of the at least one node is altered to a modified bandwidth to account for a change in a characteristic of the communication channel.

* * * * *